Oct. 25, 1932.  J. W. TATTER  1,884,373
BRAKE
Filed Feb. 27, 1928  6 Sheets-Sheet 1

Witness:
William P. Kilroy

Inventor:
John W. Tatter
Hill & Hill
By
Attys

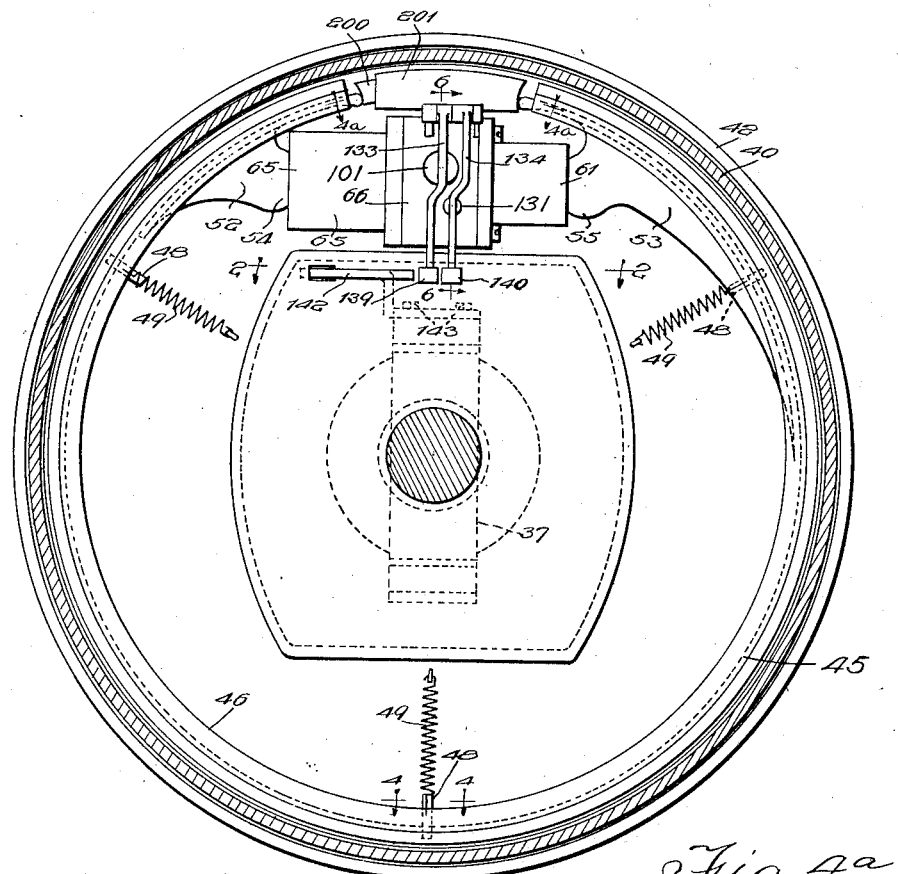
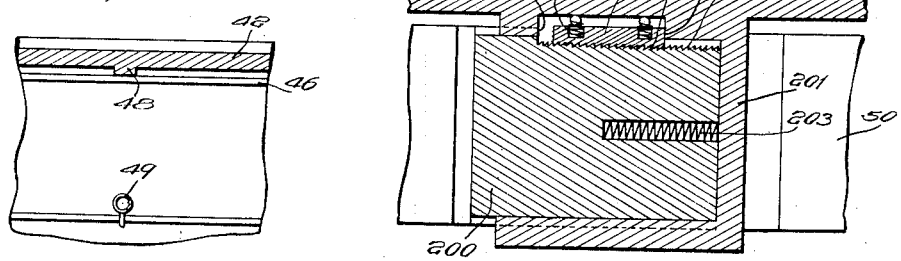

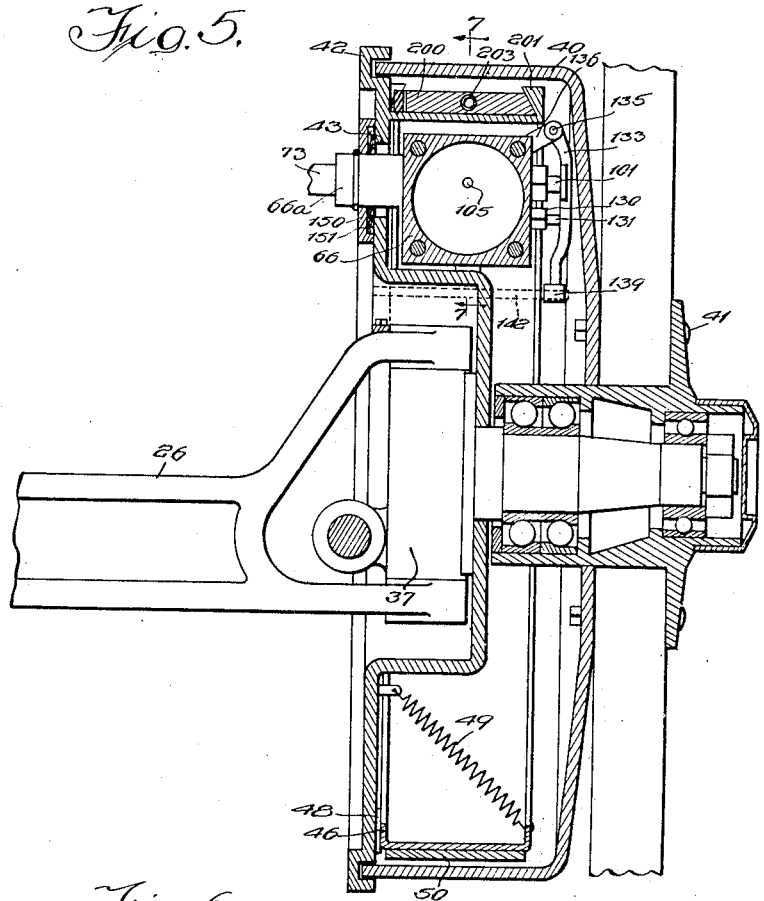

Oct. 25, 1932.   J. W. TATTER   1,884,373
BRAKE
Filed Feb. 27, 1928   6 Sheets-Sheet 4

Witness:
William R. Kilroy

Inventor:
John W. Tatter
Hill & Hill

Oct. 25, 1932.  J. W. TATTER  1,884,373
BRAKE
Filed Feb. 27, 1928    6 Sheets-Sheet 5
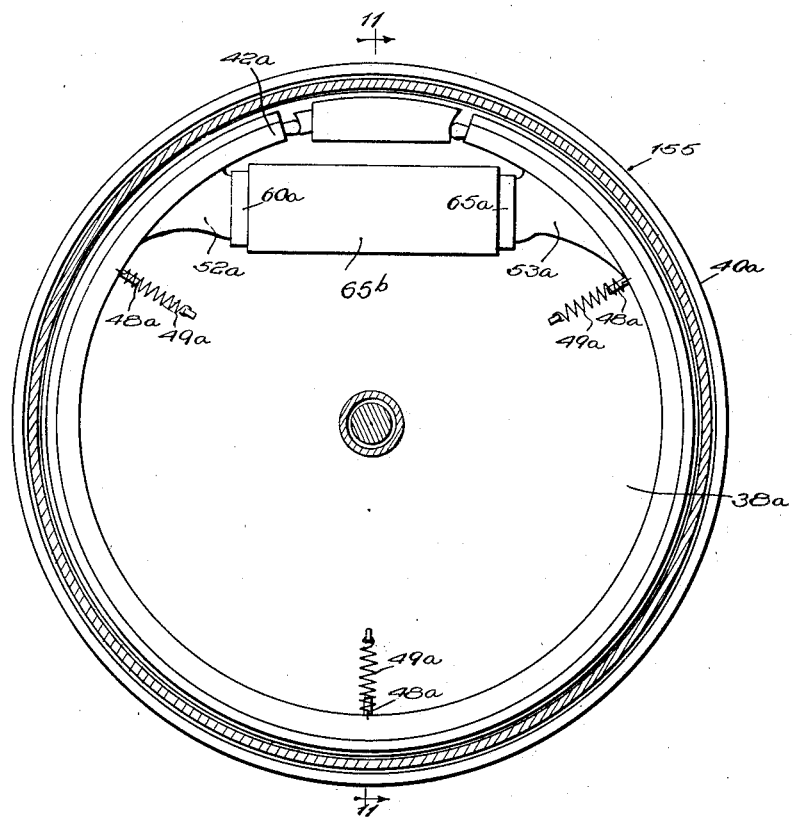
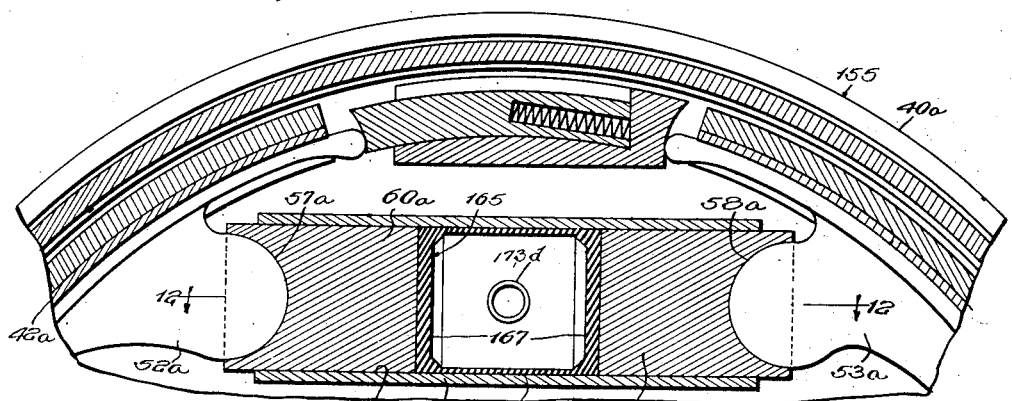

Oct. 25, 1932.                J. W. TATTER                1,884,373
                                 BRAKE
                        Filed Feb. 27, 1928    6 Sheets-Sheet 6
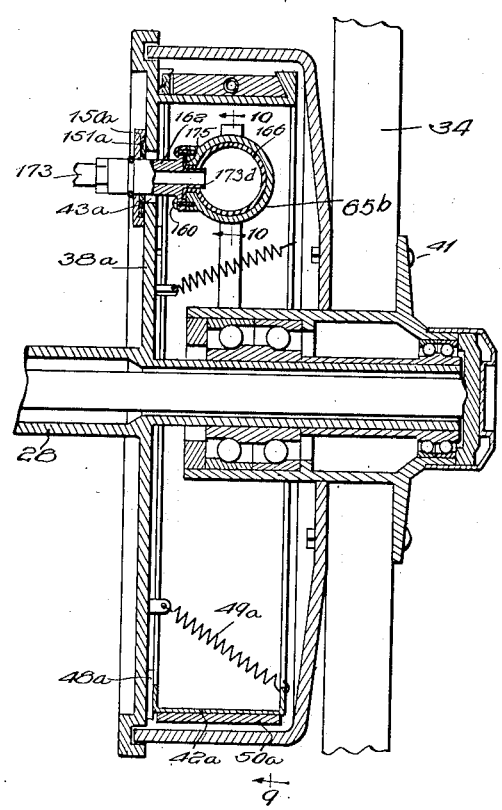
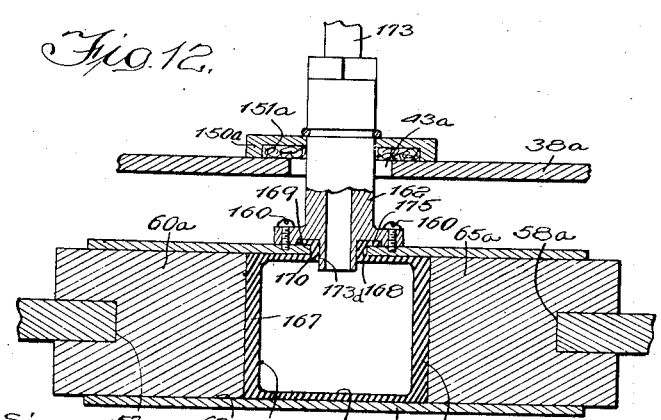

Patented Oct. 25, 1932

1,884,373

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE

Application filed February 27, 1928. Serial No. 257,395.

My invention relates to brakes and has among its other objects the production of devices of the kind described that are compact, durable, efficient and satisfactory for use wherever found applicable.

A particular object of the invention is to provide improved brake mechanism for automobiles, and the like, which brake mechanism efficiently utilizes the weight of the automobiles when the braking effort is applied.

Another particular object of the invention is to provide improved brake mechanism for automobiles, and the like, which brake mechanism prevents the automobiles from skidding and permits them to be steered readily when they are being driven over slippery surfaces such as ice with the brakes applied.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is an enlarged section taken on line 3—3 of Fig. 1;

Fig. 4 is a section taken on line 4—4 of Fig. 3;

Fig. 4a is a section taken on line 4a—4a of Fig. 3;

Fig. 5 is an enlarged section taken on line 5—5 of Fig. 1;

Fig. 6 is a section taken on line 6—6 of Fig. 3;

Fig. 9 is an enlarged section of the brake structure associated with the rear wheels of the vehicle, and is taken on line 9—9 of Fig. 11, the mechanism shown in Fig. 9 being drawn to the same scale as the mechanism shown in Fig. 3;

Fig. 10 is a section taken on line 10—10 of Fig. 11;

Fig. 11 is a section taken on line 11—11 of Fig. 9, Fig. 11 being drawn to the same scale as Fig. 9; and Fig. 12 is a section taken on line 12—12 of Fig. 10.

Figure 1:
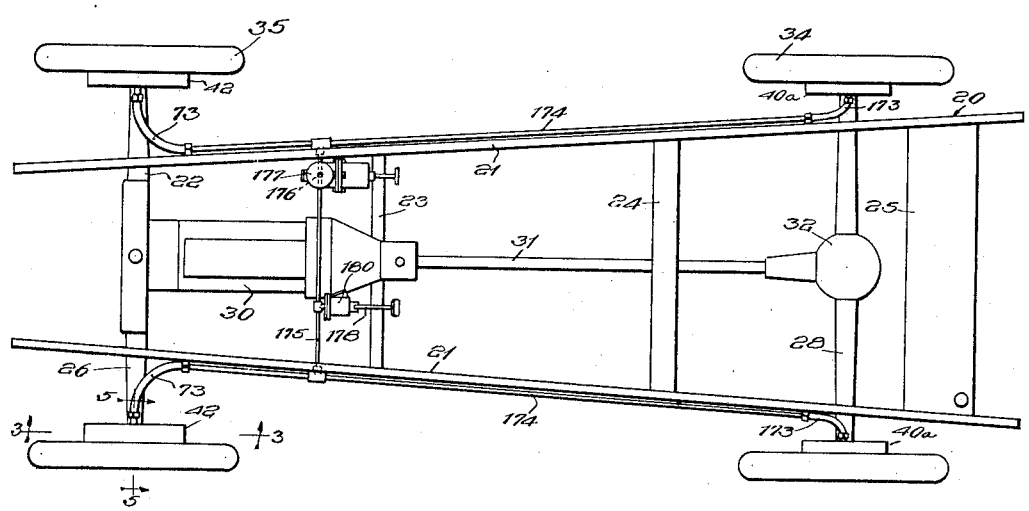
Fig. 1 is a plan view of the chassis of an automobile upon which brake mechanism embodying my invention has been installed.
Figure 2:
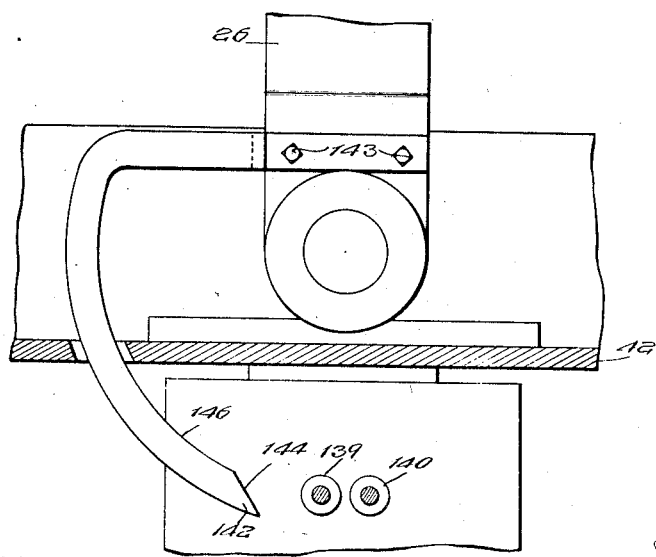
Fig. 2 is a section taken on line 2—2 of Fig. 3.

Referring for the present to Fig. 1, the reference character 20 designates generally the chassis of an automobile, which chassis may comprise longitudinal frame members 22, 23, 24, 21 and transverse frame members 22, 23, 24 and 25. At 26, I have shown a front axle and the rear axle housing is designated by the reference character 28. I have shown an internal combustion engine at 30 which is operatively connected to the rear wheels of the chassis by means comprising a usual propeller shaft 31 and a differential 32. The rear wheels are identified by the reference character 34 and the front wheels by the reference character 35, the front wheels 35 being operatively connected to the front axle 26 by steering knuckles 37.

I have illustrated one form of my invention in the drawings, which form comprises hydraulically operated brakes for the front and rear wheels but it is to be understood that my invention is limited to hydraulically operated brakes only to the extent indicated in the appended claims.

Referring now to Figs. 1 to 8, inclusive, it will be noted that each of the brakes associated with the front wheels 35 comprises a brake drum 40 which is secured by bolts 41, or the equivalent, to the associated wheel. One end of the brake drum 40 is closed by a plate or disc 42, the disc 42 being provided with an aperture 43, the purpose of which will presently be described.

Disposed within the brake drum 40 is a brake band 45 which resembles the brake band shown in my copending application, Serial Number 257,397, filed February 27, 1928. In the present instance, the brake band 45 is preferably formed from pressed steel and is preferably provided with inwardly extending annular flanges 46 which are of greatest height at a point substantially midway intermediate the ends of the band, the flanges 46 being tapered to diminish in height toward the ends of the band. It will be noted that the construction is such that one edge of the brake band rides against lugs 48 provided upon the inner surface of the plate or disc 42 and that a plurality of tensioned springs 49 urge the band against the lugs. Of course, in the preferred embodiment of the invention, the surfaces on the lugs that are engaged by the bands are finished. Referring to Figs. 3 and 5, it will also be noted that the springs 49 tend to center the brake band with respect to its drum and to hold the brake band 45 in a position wherein a lining 50 carried by it does not effectively engage the interior surface of the drum 40.

Figure 7:
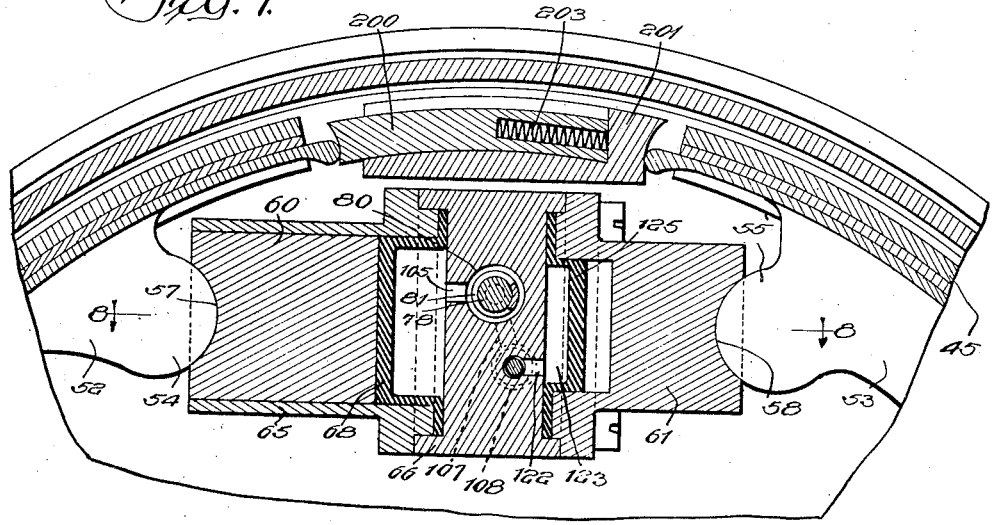
Fig. 7 is a section taken on line 7—7 of Fig. 5.
Figure 8:
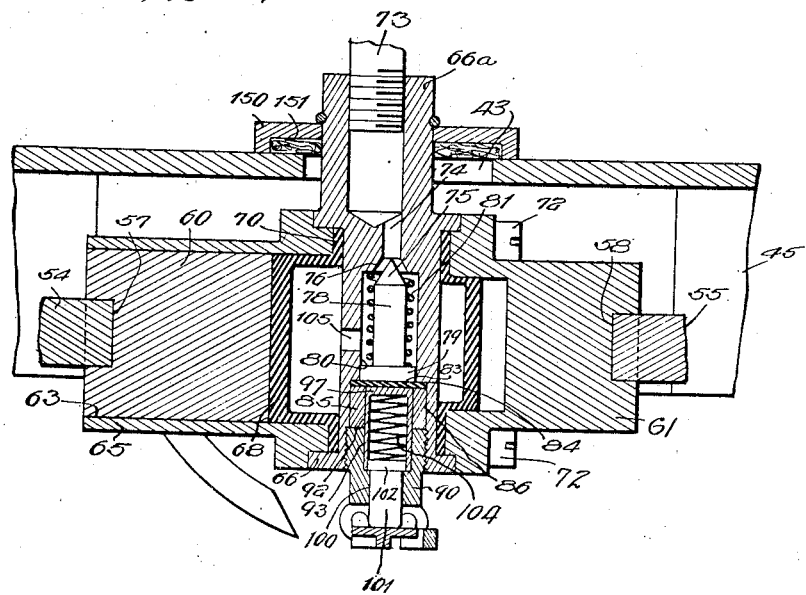
Fig. 8 is a section taken on line 8—8 of Fig. 7.

Secured to the ends of the band 45 are lugs 52 and 53 having rounded heads 54 and 55, respectively, adapted to rest in slots 57 and 58, respectively, the slots 57 and 58 being formed in a piston or plunger 60 and a cap 61, respectively (see Figs. 7 and 8). The plunger 60 is slidably journaled in a bore 63 formed in a cylinder 65 which is closed at one end by a block 66. The lug 53 is longer than the lug 52 and reinforces that end of the brake band which is disposed to the rear of the brake. The lug 53 prevents this end of the brake band from bending in an undesirable manner when the brake is operated suddenly and with much effort and therefore, protects the lining fixed to this end of the band from undue wear. Interposed between the cylinder 65 and the block 66 is a sealing member 68 which is preferably formed from rubber and preferably resembles the sealing members shown and described in my copending application, Serial No. 211,529 filed August 8, 1927. It will be noted that the sealing member 68 is preferably cup-shaped and is provided with an annular flange 70 adapted to be clamped between the block 66 and one end of the wall of the cylinder 65, the cylinder 65 being rigidly secured to the block 66 by any suitable means such as bolts 72, or the equivalent. Fluid may be introduced into the bore 63 through a flexible tube 73 which is screw-threaded or otherwise secured to the block 66 and communicates with a passage or bore 74 formed in the block. The passage of fluid through the bore 74 is controlled by a valve 75 adapted to engage a valve seat 76 formed at one end of the bore 74. The valve 75 is carried by a valve stem 78 which is provided at one end with a cylindrical head 79, the cylindrical head 79 being slidably journaled in a relatively large bore 80 formed in the block 66. A compression spring 81 tends to hold the valve 75 unseated. One end of the bore 80 is sealed by a sealing member 83 which, in this instance, preferably comprises a disc of rubber, or the equivalent. The rubber disc 83 is clamped between an annular shoulder 84 formed in the block 66 and a collar 85 seated in a bore 86 formed in the block 66. The bore 86 is formed concentric with the bores 80 and 74 and is of larger diameter. The collar 85 is held in place in the bore 86 by a plug 90 which is screw-threaded into the bore. It will be noted that the collar 85 and the plug 90 have aligned bores 92 and 93, respectively, in which a hollow cylinder or plunger 97 is slidably journaled. Slidably journaled in a smaller bore 100 formed in the plug 90 is a pin or stem 101 provided at its inner end with a cylindrical head 102 and interposed between the head 102 and the cylinder 97 is a compression spring 104 which is preferably of greater strength than the compression spring 81 but is so constructed that when the cylinder 97 and the pin or stem 101 are in the relative positions wherein they are shown in Figs. 6 and 8, the spring 104 is substantially fully extended and therefore, the spring 81 holds the valve 75 disengaged from the valve seat 76.

The bore 80 communicates with the bore 63 through a port 105 formed in the block 66 and it is readily apparent that when fluid under pressure is forced into the bore 80 by way of the bore 74, the fluid will flow into the bore 63 through the port 105 and displace the plunger 60 to the left (Figs. 7 and 8). Of course, when the plunger 60 is displaced in this manner, the sealing member 68 is elongated and it is for this reason that it is preferably made from some substance such as rubber, or the like.

Referring to Fig. 7, it will be noted that the bore 80 communicates through a port 107 with a bore 108 formed in the block 66. As best shown in Fig. 6, a valve seat 109 is formed at one end of the bore 108 and is engageable by a valve 110 formed at one end of a sleeve 112 which is slidably journaled in the bore 108. Interposed between the sleeve 112 and a plug 113 screw-threaded into the bore 108 is a compression spring 114 which tends to hold the valve 110 in engagement with the valve seat 109. Projecting from the sleeve 112 and preferably formed integral therewith is a pin 115 which is slidably journaled in a bore 117 formed in the block 66. One portion of the bore 117 is enlarged as at 119 to provide an annular chamber 120 around the pin 115. The annular chamber 120 communicates through a port 122 with a chamber 123 formed in the cap 61. The sleeve 112 is so constructed that when fluid flows into the bore 108 by way of the port 107 and the valve 109 is unseated, the fluid may pass through the bore 108, the annular chamber 120 and through the port 122 into the chamber 123. A sealing member 125 is preferably clamped between the block 66 and the cap 61 and is preferably cup-shaped in the same manner as the aforementioned sealing member 68. As shown, the sealing member 125 forms a partition transversely of the chamber 123 and is so arranged that when fluid is forced into the chamber 123 by way of the port 122, it is extended and if the pressure is sufficiently high, will allow the major portion of the chamber to be filled with the fluid. Of course, the sealing member 125 is preferably formed from rubber.

As illustrated in Fig. 6, one end of the pin 115 preferably abuts against a sealing member 126 which is clamped between a shoulder 127 formed in the block 66 and a collar 128 seated in a bore 129 formed in the block. The collar 128 is held in place in the bore 129 by a plug 130 which is screw-threaded into the bore 129. Slidably journaled in aligned apertures provided in the collar 128 and the plug 130 is a pin 131 which is engageable with the sealing member 126. The sealing member 126 is preferably formed from rubber and it is readily understood that when the pin 131 is displaced longitudinally to the left (Fig. 6) it may displace the pin 115 and the sleeve 112 longitudinally to the left against the action of the spring 114. If fluid then enters the bore 108 through the port 107, it may flow through the annular chamber 120 and the port 122 into the chamber 123.

The means for controlling the valves 75 and 110 preferably comprises levers 133 and 134, the levers 133 and 134 being pivoted upon a pin 135 which is carried by lugs 136 preferably formed integral with the block 66 (see Figs. 3 and 6). The lever 133 is engageable with the pin 101 and the lever 134 is engageable with the pin 131. At their free ends, the levers 133 and 134 preferably carry antifriction rollers 139 and 140, respectively. The arrangement is such that the rollers 139 and 140 associated with each of the front brakes are adapted to engage one of a pair of cam members 142 secured by bolts 143, or the equivalent, to the front axle 26. Each of the cam members 142 has a cam surface 144 adapted to engage the associated rollers 139 and 140 and to displace them in such manner that the levers 133 and 134 will displace the pins 101 and 131, respectively, to displace the associated valves 75 and 110, respectively. Thus, if the lever 133 is displaced in this manner, it will seat the valve 75 and if the lever 134 is displaced in this manner, it will unseat the valve 110. The cam members 142 also comprise dwells 146 which hold the rollers 139 and 140 in the positions wherein they are displaced by the cam surfaces 144. Of course, each dwell 146 is an arcuate surface having a center coincident with the axis of rotation of the associated steering knuckle.

If the chassis shown in Fig. 1 is travelling forward in a substantially straight line and fluid under pressure is forced into the front brakes through the flexible tubes 73, it is obvious that the fluid will flow through the ports 74, the bores 80 and through the ports 105 into the cylinders 63 of the front brakes so that the pistons or plungers 60 will be displaced in a direction away from their blocks 66 and the forward ends of the brake bands 45 will be moved into positions wherein they bring their friction linings into effective engagement with the brake drums. When the forward ends of the brake bands 45 have brought the friction linings adhering thereto into engagement with the brake drums and additional fluid under pressure is forced into the front brakes through the pipes 73, the blocks 66, the cylinders 65 and the caps 61, by reason of the relative mobility of these parts with respect to the piston or plunger 60, and the increased pressure within the sealing member 68, are displaced toward the rear of the chassis so that the rear ends of the brake bands 45 bring their friction linings into effective engagement with the brake drums, the longer lugs 53 having resisted distortion of the rear ends of the brake bands until the forward ends thereof have been brought into engagement with the brake drums. Of course, each brake band 45 is constructed so that when the ends thereof have been displaced away from each other to such an extent that the friction linings thereon effectively engage the brake drum, the brake band has expanded in such manner that the entire brake lining is brought into effective engagement with the brake drum. This expansion of the brake band is against the action of the springs 49 and against the action of the brake band itself as the brake band is preferably somewhat resilient and tends to contract into a position wherein it does not hold its brake lining in effective engagement with the brake drum. It will be noted that each block 66 is provided with a boss 66a into which one end of the associated tube 73 is inserted, the boss 66a being arranged to project through the aforementioned aperture 43 provided in the associated plate or disc 42. The aperture 43 is preferably considerably larger in diameter than the boss 66a so that the block 66 may be displaced toward the front or rear of the brake. In the illustrated embodiment of the invention, the aperture 43 is closed by a cup-shaped member 150 carried by the boss 66a. If desired, a washer 151, of felt or the equivalent, may be inserted between the cup-shaped member 150 and the associated disc 42 to prevent dirt, or other foreign matter, from entering the brake drum by way of the aperture 43.

When the brake bands 45 are expanded in the manner described above to bring their friction linings into effective engagement with the brake drums, the brakes function in the usual manner and tend to prevent rotation of the front wheels so that the automobile or chassis may be slowed down or brought to a full stop. It will be noted that as long as the chassis travels in a substantially straight line, the rollers 139 and 140 do not engage the cam members 142 and the valve 75 remains unseated while the valve 110 remains seated. However, if a right or left turn is made with the vehicle, the brake associated with the outside front wheel on the turn is rendered functionally inoperative. Thus, if the chassis shown in Fig. 1 is assumed to be travelling forward and a right turn is made, the roller 139 associated with the front wheel on the outside of the turn (see Fig. 2) engages the cam surface 144 of the associated cam member 142 and the roller and its lever 133 are angularly displaced around the pin 135 so that the lever displaces the pin 101, the spring 104, the hollow cylinder 97 and the valve 75 until the valve 75 engages the valve seat 76. This displacement of the valve 75 is against the action of the spring 81. As set forth above, the spring 104 is of heavier construction than the spring 81 and does not yield to any appreciable extent unless the valve 75 has been seated upon the valve seat 76. When the valve 75 of the outer front wheel is closed, fluid under pressure can not be forced into the brake and after the front wheels have been turned sufficiently that the roller 140 of the outer front wheel rides up upon the cam surface 144, its lever 134 displaces the pins 131 and 115 and the valve 110. The fluid under pressure then contained in the bore 63 between the sealing member 68 and the block 66 flows out through the port 105 into the bore 80. From the bore 80 it flows through the port 107 into the annular chamber 120 and thence through the port 122 into the relief chamber 123 provided in the associated cap 61. Of course, the brake band of the outer front wheel then contracts to some extent and relatively little braking effort is applied to this wheel. However, the brake on the inner front wheel on the turn functions effectively and this braking effort may be maintained as long as it is desired. The purpose of this construction is this: When braking effort is applied to the front and rear wheels of an automobile which is travelling over a slippery surface such as ice, it is always impossible to steer the automobile if the front wheels lock. The vehicle simply skids along in a straight line or off at some angle which is not determined by the positions of the front wheels. However, if the front wheel on the outside of the turn is permitted to turn or is unlocked and the braking effort is maintained on the front wheel on the inside of the turn, the wheel on the inside of the turn will be retarded sufficiently so that the vehicle will turn in the direction determined by the front wheels. This arrangement is particularly advantageous when it becomes necessary to turn out from behind a preceding vehicle when the preceding vehicle comes to a sudden stop.

Fluid that is forced into the chamber 123 through the port 122 may elongate the side wall of the sealing member 125 but it is readily understood that when the front wheels have been turned back into a position wherein the rollers 139 and 140 are disengaged from the cam members 142 and the operator ceases to force fluid under pressure into the brakes, the sealing member 125 will contract and drive the excess supply of fluid out of the chamber 123 through the port 122.

Automatically adjustable means is preferably provided in each of the front brakes and also in the rear brakes hereinafter described for limiting angular displacement of the brake band around the axis of rotation of the drum. This means is preferably substantially identical in construction with means more fully shown and described in my copending application Serial No. 257,397, filed February 27, 1928, and is best shown, in this instance, in Figs. 4 and 4a of the drawings. Thus, one end of each brake band engages a slide 200 mounted in a lug or block 201 which is engaged by the other end of the band. A spring 203 tends to displace the slide 200 relative to the block 201 and a slide 204 has teeth 205 engageable with teeth 206 formed on the slide 200. Springs 208 tend to hold the teeth 205 in engagement with the teeth 206. The slide 204 may travel from a position wherein it engages a shoulder 209 in the block 201 to a position wherein it engages a shoulder 210 formed in the same block. The block 201 is preferably formed integral with the plate 42 which closes one end of the drum. As more fully explained in the copending application, Serial No. 257,397, the slide 200 is moved into adjusted positions with respect to the block 201 when the lining wears away and the slide 200 and block 201 limit the angle through which the band may be displaced by the drum when the drum tends to drag the band around its axis of rotation.

Referring now to Figs. 9 to 12, inclusive, wherein I have shown the construction of the brakes provided upon the rear wheels of the chassis shown in Fig. 1, these brakes are designated generally by the reference character 155 and comprise brake drums 40a that are secured by bolts 41, or the equivalent, to the rear wheels 34. Disposed within each brake drum 40a is a brake band 42a which is similar in construction to the brake bands 42. However, the brake bands 42a are of smaller diameter than the brake bands 42 and are of less width. The brake bands 42a have friction or brake linings 50a engageable with the interior surfaces of the brake drums 40a, the brake drums 40a being similar in construction to the brake drums 40 but being of less diameter and of less width. As best illustrated in Figs. 9 and 10, each brake band 42a has lugs 52a and 53a rigidly secured to it, the lugs 52a and 53a having the same general shape as the aforementioned lugs 52 and 53 and being adapted to rest in grooves 57a and 58a formed in the pistons or plungers 60a and 65a. The plungers 60a and 65a are slidably journaled in a bore 63a provided in a cylinder 65b which, as best shown in Fig. 12, is rigidly secured by screws 160, or the equivalent, to a tubular member 162. The tubular member 162 projects through a relatively large aperture 43a provided in the plate or disc 38a which closes one end of the associated drum 40a. Disposed in the bore 63a and positioned intermediate the plungers 60a and 65a is a hollow seal or fluid container 165 which is preferably formed from rubber. The seal or fluid container 165 comprises a relatively thin cylindrical wall 166 and end walls 167. Preferably formed integral with the cylindrical wall 166 is a boss 168 which projects through an aperture 169 formed in the cylinder 65b. An aperture 170 is provided through the boss 168 and an extension 173d provided upon the tubular member 162 preferably extends through the aperture so that fluid may be introduced into the interior of the fluid container 165. At its outer end, the boss 168 is preferably provided with an annular flange 175 which is preferably clamped between the outer surface of the cylinder 65b and the tubular member 162. A cup-shaped member 150a and a felt washer 151a, or the equivalent, are preferably provided for closing the aperture 43a so that dust, or other foreign substance, can not enter the drum 40a through the aperture 43a. Flexible tubes 173 connect the tubular members 162 of the rear brakes with pipes 174 which extend longitudinally of the chassis and at their front ends are connected to the flexible tubes 73. The pipes 174 communicate with each other through a pipe line 175 extending transversely of the chassis and the pipe line 175 communicates through a vertically disposed pipe 176 with the underside of a combined filling and regulating device 177 which is more fully shown and described in my copending application, Serial No. 211,529 filed August 8, 1927. At 178, I have shown a foot pedal or brake lever which is operatively connected with the pipe line 175 through a cylinder and plunger device 180, the construction being such that when the foot pedal 178 is depressed, fluid is forced into the pipe line 175 and thence through the pipes 174 to the front and rear brakes to cause them to function. The cylinder and plunger device 180 is similar to that shown in my copending application, Serial No. 211,529 filed August 8, 1927.

It may be mentioned that the brake bands 42a of the rear brakes are held in engagement with the finished surface of lugs 48a, springs 49a being provided for this purpose. The springs 49a resemble the above described springs 49 and have substantially the same functions. The lugs 48a are preferably formed integral with the plate or disc 38a and the plate or disc 38a is preferably formed integral with the rear axle housing 38.

Obviously, when fluid under pressure is forced into the interior of the fluid containers 165, the containers will elongate and displace the pistons or plungers 60a and 65a in such manner that the brake bands 42a will be expanded and they will bring their friction linings into effective engagement with the interior surfaces of the drums 40a. When the pressure within the pipe system is relieved, the fluid containers 165 together with the springs 49a and the brake bands 42a contract and disengage the brake linings from the brake drums.

The operation of the above described apparatus is substantially as follows: When the operator desires to slow down or stop the chassis, it is only necessary to depress the foot pedal 178 so that fluid will be forced from the device 180 into pipe line 175 and the pressure throughout the system will be raised to such an extent that the brake bands will be expanded and will have their brake linings engage the interior surfaces of the drums. As the drums are rigidly secured to the wheels, the engagement of the brake drums by the friction linings retards rotation thereof and the automobile may be brought to a full stop or slowed down to any desired speed. However, if the operator applies the brakes when a turn is being made, the outer front wheel on the turn runs quite freely after the front wheels have been turned through a relatively small angle. This permits the inner front wheel on the turn to aid in turning the vehicle in the desired direction.

As set forth above, the rear brakes are preferably smaller in construction than the front brakes but the result obtained by this construction can be obtained in other ways and the invention is limited thereto only to the extent indicated in the appended claims. However it will be readily understood that if the front and rear brakes are properly adjusted, the front brakes will be much more effective than the rear brakes in that the front brakes have brake bands of greater diameter and therefore, have an increased leverage as compared with the brake bands in the rear wheels.

When the brakes of an automobile having four-wheel brakes are operated, the rear end of the chassis and the body of the automobile tends to spring upward and the front end of the chassis and the engine bear down heavily upon the front axle. Therefore, it is a relatively simple matter to lock the rear wheels as there is less friction between the rear wheels and the ground at this time than there is between the front wheels and the ground. Obviously, then the front wheels will tend to keep turning and a greater braking effort may be applied thereto without causing them to lock and slide. Brakes embodying my invention are preferably so adjusted that a greater braking effort will be applied to the front wheels than to the rear wheels as soon as the brakes are operated and the automobile can generally be brought to a full stop before the rear wheels lock. This action will prevent skidding.

Of course, when the automobile is driven backward, the action of the brakes will differ from the action thereof when the braking effort is applied while the automobile is being driven forward. The weight of the car will tend to act mainly on the rear axle. Then as the rear brakes are less effective than the front brakes, the effectiveness of the brakes collectively will not be greater or appreciably greater than the collective effectiveness thereof when the automobile is being driven forward.

Having thus described my invention, it is obvious that various immaterial modifications may be made to the same without departing from the spirit of my invention; hence I do not wish to be limited to the exact form, construction, arrangement and combination of parts herein shown and described, or uses mentioned.

What I claim as new and desire to secure by Letters Patent is:

1. In a vehicle having front and rear wheels, the front wheels being carried by steering knuckles, fluid-operated brakes for the front wheels, and means associated with each brake for actuating it, each of said actuating means comprising a plunger, means for subjecting the plunger to fluid pressure, an expansible chamber adapted to receive fluid to relieve the pressure to which said plunger is subjected, valve means controlling the flow of fluid into said chamber, a lever operatively related to said valve means and means mounted on the axle of the vehicle and operatively related to said lever for opening said valve means when the front wheels are turned into predetermined positions.

2. In a vehicle having front and rear wheels, the front wheels being carried by steering knuckles, fluid operated brakes for the front wheels, and means associated with each brake for actuating it, each of said actuating means comprising a cylinder, a plunger journaled in said cylinder, means for introducing fluid into said cylinder to displace said plunger, a valve for controlling the flow of fluid into said cylinder, an expansible chamber adapted to receive fluid to relieve pressure to which said plunger is subjected, a second valve controlling the flow of fluid into said chamber, levers operatively related, respectively, to said valves, and a cam operatively related to said levers for closing the first-mentioned valve and opening said valve when the front wheels are turned into predetermined positions.

In testimony whereof, I have hereunto signed my name.

JOHN W. TATTER.